United States Patent
Grucci et al.

(10) Patent No.: US 6,766,477 B2
(45) Date of Patent: *Jul. 20, 2004

(54) DISTRIBUTED COMPONENT TESTING IN AN ENTERPRISE COMPUTER SYSTEM

(75) Inventors: Kyle T. Grucci, Nashua, NH (US); Raman Vellayappan, Arlington, MA (US); Thomas J. Kincaid, North Andover, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/461,812

(22) Filed: Jun. 12, 2003

(65) Prior Publication Data

US 2004/0078719 A1 Apr. 22, 2004

Related U.S. Application Data

(63) Continuation of application No. 09/675,207, filed on Sep. 29, 2000, now Pat. No. 6,604,209.

(51) Int. Cl.$^7$ ................................................. G06F 11/36
(52) U.S. Cl. ........................................... 714/38; 719/315
(58) Field of Search .................. 714/43, 48; 719/315, 719/328, 316; 717/124, 125, 126, 129

(56) References Cited

U.S. PATENT DOCUMENTS

| | | |
|---|---|---|
| 5,911,068 A | 6/1999 | Zimmerman et al. ....... 709/328 |
| 6,038,378 A | 3/2000 | Kita et al. ................... 714/38 |
| 6,042,614 A | 3/2000 | Davidson et al. ........... 717/116 |
| 6,216,186 B1 | 4/2001 | Mayhead et al. ........... 710/301 |
| 6,360,268 B1 | 3/2002 | Silva et al. .................. 709/227 |
| 6,519,623 B1 | 2/2003 | Mancisidor ................. 709/100 |
| 6,519,767 B1 | 2/2003 | Carter et al. ................ 717/140 |
| 6,523,137 B1 | 2/2003 | Stone ........................... 714/38 |
| 6,542,845 B1 | 4/2003 | Grucci et al. ............... 702/122 |
| 6,684,387 B1 | 1/2004 | Acker et al. ................ 717/126 |

*Primary Examiner*—Scott Baderman
*Assistant Examiner*—Joshua Lohn
(74) *Attorney, Agent, or Firm*—Beyer Weaver & Thomas, LLP

(57) ABSTRACT

A method of automatically performing a component test at any number of locations in a distributed environment is disclosed. In general, in order to assure compatibility of the various components in an enterprise computing system, a service test is created as part of a compatibility test suite and passed to a test application server having a test application program. The test application program includes a generic vehicle class that includes a plurality of vehicle class invokers each of which is used to implement each of the object types that are run in each of a plurality of containers. During the build process of the CTS, each service test is automatically packaged with each of the appropriate vehicle classes so that each can be deployed into and run within the associated container.

20 Claims, 4 Drawing Sheets

DISTRIBUTED COMPONENT TESTING IN AN ENTERPRISE COMPUTER SYSTEM

CROSS REFERENCE TO RELATED APPLICATIONS

This is a Continuation application of prior application Ser. No. 09/675,207 filed on Sep. 29, 2000 now U.S. Pat. No. 6,604,209, the disclosure of which is incorporated herein by reference.

BACKGROUND OF THE INVENTION

1. Field of Invention

The invention relates generally to computer systems. More particularly, methods and apparatus for distributed testing of components in an enterprise computer system.

2. Description of Relevant Art

Enterprises today need to extend their reach, reduce their costs, and lower their response times by providing easy-to-access services to their customers, partners, employees, and suppliers. Typically, applications that provide these services must combine existing enterprise information systems (EIS) with new business functions that deliver services to a broad range of users. These services need to be highly available in order to meet the needs of today's global business environment secure so as to protect the privacy of users and the integrity of enterprise data, as well as both reliable and scalable to insure that business transactions are accurately and promptly processed. For a variety of reasons, these services are generally configured as distributed applications consisting of several tiers, including clients on the front end, data resources on the back end, and one or more middle tiers between them where the majority of the application development work is done. The middle tier implements the new services that integrate existing EISs with the business functions and data of the new service. The middle tier shields the client tier from the complexity of the enterprise and takes advantage of rapidly maturing Internet technologies to minimize user administration and training.

One approach to constructing such an enterprise computing system is to use component based, multi-tier applications based on, for example, Java 2 Enterprise Edition (J2EE) technology from Sun Microsystems Inc. of Mountain View, Calif. As well known in the art, J2EE is a Java platform designed for the mainframe-scale computing typical of large enterprises representing a multi-tier design that simplifies developing, deploying, and maintaining enterprise applications. In this regard, J2EE has been designed to simplify application development in a thin client tier environment by simplifying application development and decreasing the need for programming and programmer training by creating standardized, reusable modular components and by enabling the tier to handle many aspects of programming automatically. It enables developers to focus on the specifics of programming their business logic, relying on the J2EE server to provide system services, and client-side applications (both stand alone and within web browsers) to provide the user interaction. Once developed, business logic can be deployed on servers appropriate to existing needs of an organization.

J2EE includes a number of components such as Enterprise JavaBeans (EJB) that is a server-based technology for the delivery of program components in an enterprise environment, Java servlet application program interfaces that enhances consistency for developers without requiring a graphical user interface, and Java Server Pages (that is the Java equivalent to Microsoft's Active Server Pages) is used for dynamic Web-enabled data access and manipulation.

Compatibility is one of the keys to the success of the J2EE and one of the factors that make it so productive for IT organizations. With this in mind, J2EE platform vendors will need to verify that their implementations conform to the J2EE platform specification. Toward that end, what is referred to as a J2EE Compatibility Test Suite (CTS) has been developed by Sun Microsystems that ensures consistent implementation across various vendor offerings. For application developers, this means full portability for enterprise applications. The CTS includes tests for all classes and methods required by the J2EE specification as well as end-to-end tests to check that all layers of a J2EE application will interact correctly and consistently. In this way, the CTS helps ensure that Enterprise JavaBeans components, JavaServer Pages, and servlets that run on one vendor's J2EE branded configuration will run on every J2EE branded configuration. In this way, the CTS assures enterprises and developers that APIs and development features are available in the branded implementation and work in a uniform way.

Many of the tests included in the CTS are not end to end tests in that the test must be run at several locations (i.e., containers) since the Java specification defines several locations from which some or all of the aforementioned APIs must be accessible which must be tested as part of the CTS. One such test is an API test that checks to make sure that a service API (such as, for example, JDBC, JTA, JavaMail, etc.) is implemented according to the Java specification. Unfortunately, however, as currently configured, a separate test must be written for each API in each J2EE container. By writing separate tests for every API in every container, a substantial amount of programming resources is wasted since substantially the same code is copied for every test so written.

Therefore, in view of the foregoing, it would be advantageous and therefore desirable to have the capability of performing a distributed test in an enterprise computing environment such that a programmer would only be required to know the API for which the test is designed and not its particular location.

SUMMARY OF THE INVENTION

Broadly speaking, the invention relates to an improved method, apparatus and computer system for performing a distributed test in an enterprise computing environment. In one embodiment, a method of automatically performing a component test at any number of locations in a distributed environment is disclosed. In general, in order to assure compatibility of the various components in an enterprise computing system, a service test is created as part of a compatibility test suite and passed to a test application server having a test application program. The test application program includes a plurality of vehicle classes each of which is used to implement each of the object types that are run in each of a plurality of containers, such as, for example, a JSP vehicle, a servlet vehicle, and an EJB vehicle. During the build process of the CTS, each service test is automatically packaged with each of the appropriate vehicle classes so that each can be deployed into and run within the associated container.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

Figure 1:
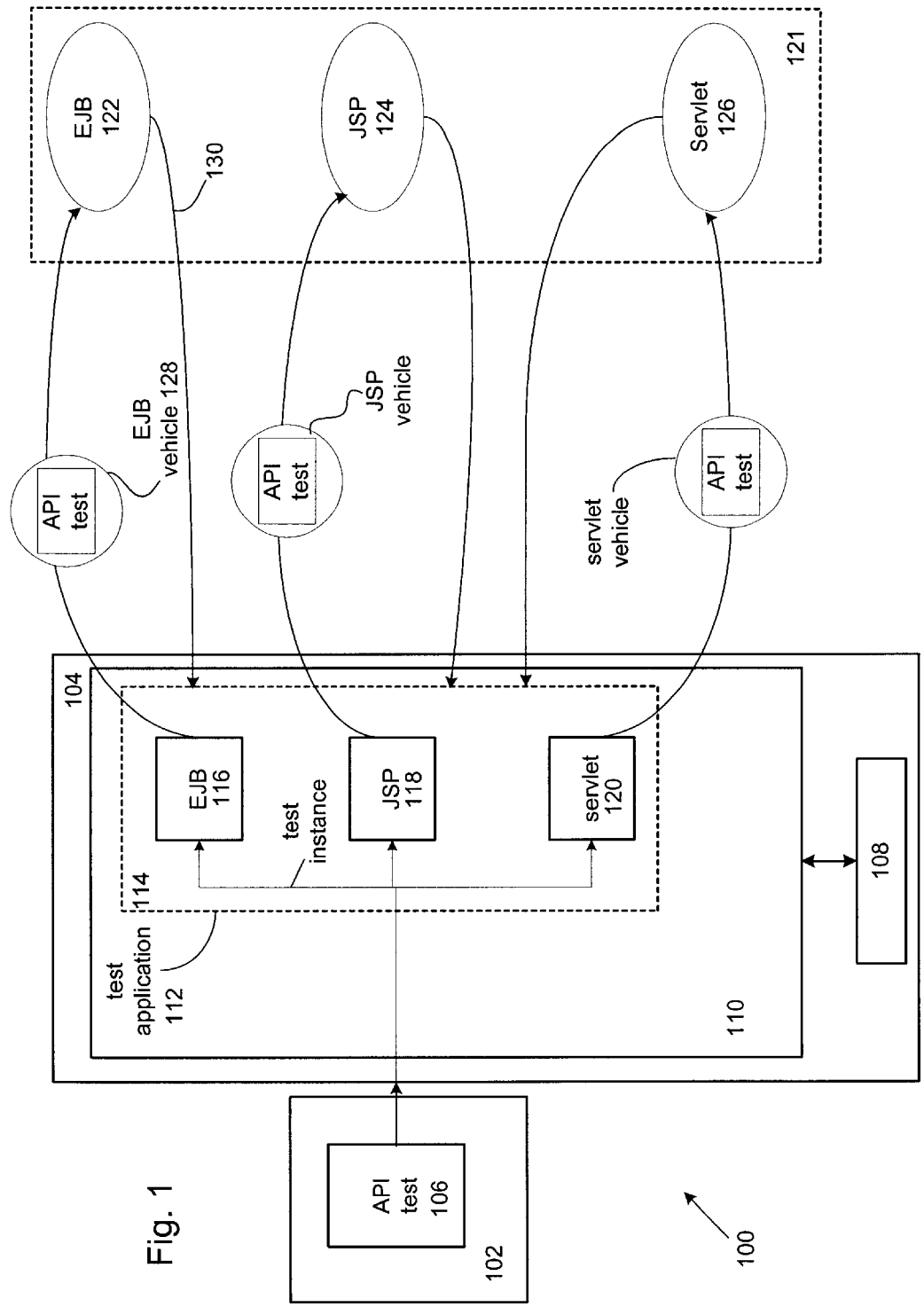
FIG. 1 shows a J2EE computing system test in accordance with an embodiment of the invention.

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

In general, in order to assure compatibility of the various components in an enterprise computing system, a service test (generally in the form of an API test) is created as part of a compatibility test suite (or CTS) and passed to a test application server having a test application program. It should be noted, that the API test so created is location independent in that the API test does not comprehend any particular component (or location) and therefore includes code that can be re-used to test compatibility of any and all of the components so included.

In the described embodiment, the test application program (sometimes referred to as a test harness) includes a plurality of vehicle classes each of which is used to implement each of the object types (EJB, JSP, Servlet, and Application client) that are run in each of the J2EE containers. In a preferred embodiment, during the build process, of the CTS, each service test is automatically packaged with an appropriate vehicle class so that each can be deployed into and run within the associated J2EE container.

For example, then the test application invokes a service test, an instance of the API test is created and passed to the appropriate vehicle which was deployed into a J2EE container. Once inside the container, the test is run and the result is returned back to the test application.

In this way, the invention allows for maximum code re-use as well as providing developers with the ability to focus on writing the service API test while the actual running of the test is managed by the inventive test application using an appropriate set of vehicle classes. In addition to providing a more efficient approach to writing and executing service tests in a distributed environment, the invention allows for the addition of new vehicle classes (if necessary) to run existing tests without the developer being required to develop new code.

Although, the invention will initially be described in terms of a J2EE based enterprise computer system, the present invention can be used in any networked computer system that requires any form of distributed component testing. It should be noted that the J2EE application model divides enterprise applications into three fundamental parts: components, containers, and connectors. Components are the key focus of application developers, while system vendors implement containers and connectors to conceal complexity and promote portability. Containers intercede between clients and components, providing services transparently to both, including transaction support and resource pooling. Container mediation allows many component behaviors to be specified at deployment time, rather than in program code. Connectors sit beneath the J2EE platform, defining a portable service API to plug into existing enterprise vendor offerings. Connectors promote flexibility by enabling a variety of implementations of specific services.

With reference to FIG. 1, an enterprise computing system 100 in accordance with an embodiment of the invention is shown. For the sake of this discussion, the enterprise computing system 100 is a J2EE system 100 but it should be noted that any component based distributed computing system can be used. In the described embodiment, the system 100 includes a client computer 102 coupled to a test application server computer 104. It should be noted that the client computer 102 can be used by a developer, for example, to code an API test 106 used to test various system component characteristics. It should be noted that pure client-side user interfaces can use standard HTML and Java technology-based applets. Support for simple HTML means quicker prototypes, and support for a broader range of clients.

The key to validating the Java 2Enterprise Edition is the J2EE Reference Implementation that provides all the specified technologies, plus a range of sample applications, tools, and documentation. This lightweight implementation of the J2EE standard is provided for two purposes. First, it provides system vendors with a standard by which to compare their own implementations. Second, it provides application developers with a way to familiarize themselves with J2EE technology as they explore commercial products for full-scale deployment of J2EE applications. Along these lines, the Compatibility Test Suite (CTS) ensures consistent implementation across various vendor offerings. For application developers, this means full portability for enterprise applications. The suite includes tests for all classes and methods required by the J2EE specification. It also includes end-to-end tests to check that all layers of a J2EE application will interact correctly and consistently.

With this in mind, the service test 106 is an API test included in a compatibility test suite (CTS) used to test the compliance of the system 100 to the J2EE Reference Implementation. In the described embodiment, the client computer 102 includes a processor 108 used to perform executable instructions (i.e., software) stored in a memory 110 that takes the form of a test application 112, also referred to as a test harness.

In a preferred embodiment, the test application server 104 includes a plurality of containers 116–120 each of which contains an appropriate vehicle classe 128–132, respectively. For example, the container 116 is an EJB container 116 that includes an EJB vehicle class 128. In the described embodiment, each of the vehicle classes 128–132 is used to implement an associated object type represented by, for example, the various API tests 122–126. One such API test is an JDBC API 122, another is a JavaMail API 124, and yet another is a RMI-IIOP API 126. As well known in the art, business logic is encapsulated in Enterprise JavaBeans (EJB) components such that client interaction can be presented through plain HTML web pages, through web pages powered by Java technology-based applets, Java Servlets API, or JavaServer Pages technology, or through stand-alone Java applications. Components communicate transparently using various standards: HTML, XML, HTTP, SSL, RMI, IIOP, and others.

In a preferred embodiment, during build time of the CTS, the API test 106 is automatically packaged with an appropriate one of the plurality of vehicle classes so that each can be deployed into and run within the associated J2EE container when required. During runtime, the test application 112 creates an instance of the API test 106 and passes that instance to any of the vehicles classes to be tested. Once the API test 106 is run, the result is passed back to the test application 112. It should also be noted that each of the API tests can be run from any of the vehicle classes. For example, the JDBC API test 122 can be run from the JSP vehicle and/or the servlet vehicle. Therefore in those cases when an additional test is coded, the developer need only code the particular test and not the locations where the test will be performed thereby saving substantial resources.

Figure 2:
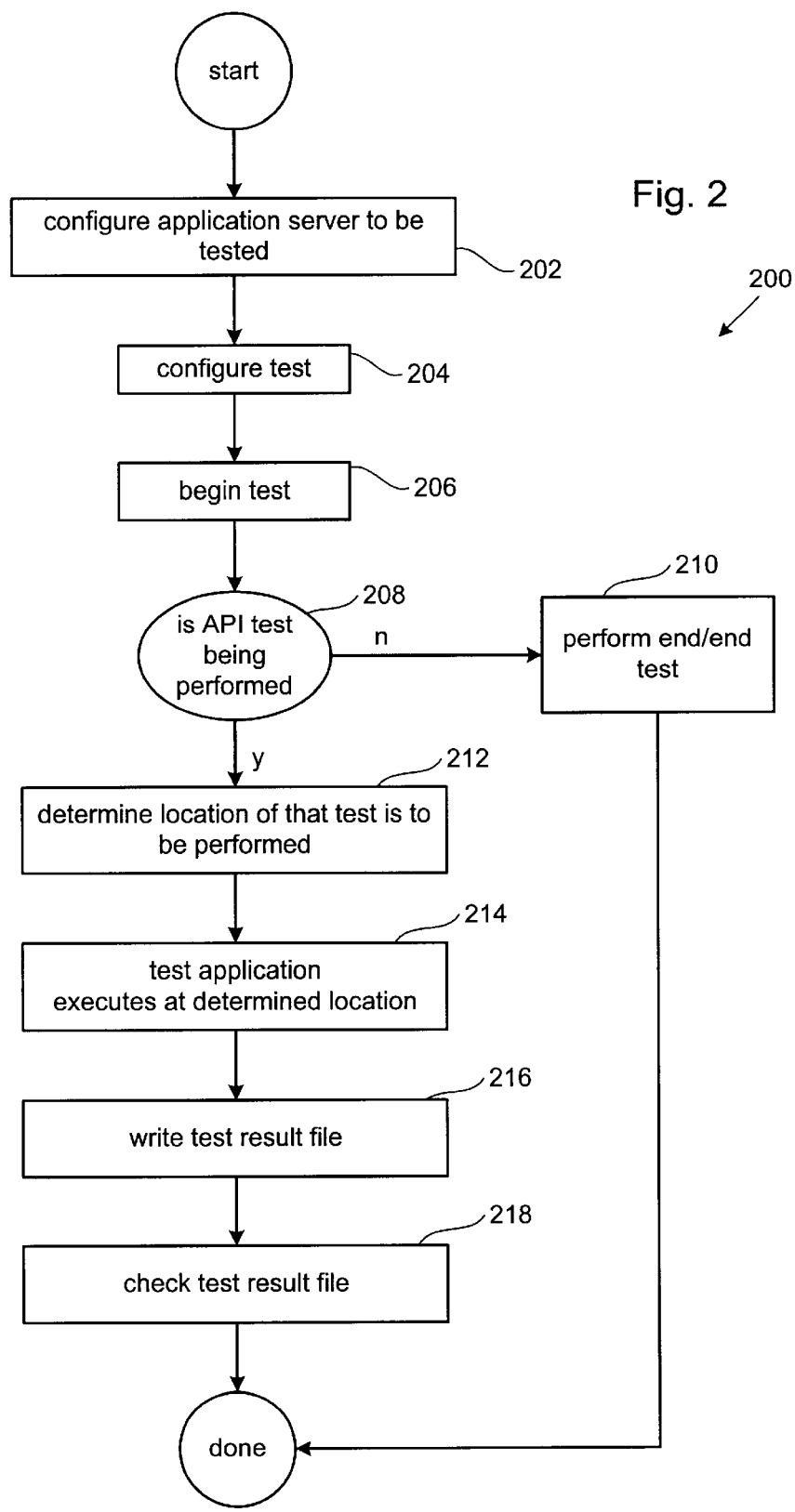
FIG. 2 shows a flowchart detailing a process for deploying a test instance in a distributed computing environment.

FIG. 2 shows a flowchart detailing a process 200 for deploying a test instance in a distributed computing environment. The process 200 begins at 202 by configuring the application server to be tested. Typically, such configuration is directed at setting up the appropriate J2EE services to be tested, such as for example, setting up a WEB server and/or an EJB server. Once the application server has been configured, the test to be performed is configured at 204 and the configured test is then begun at 206. At 208, a determination is made whether or not the test being performed is an API test. If it is determined that the test is not and API test, then the test is an end to end test (end/end) and it is performed at 210. If, however, the test is determined to be an API test, then the location of the test is determined at 212 and the test is run at the determined location at 214. At 216, the test results are written to a result file by the test application and at 218 the test result file is checked.

Figure 3:
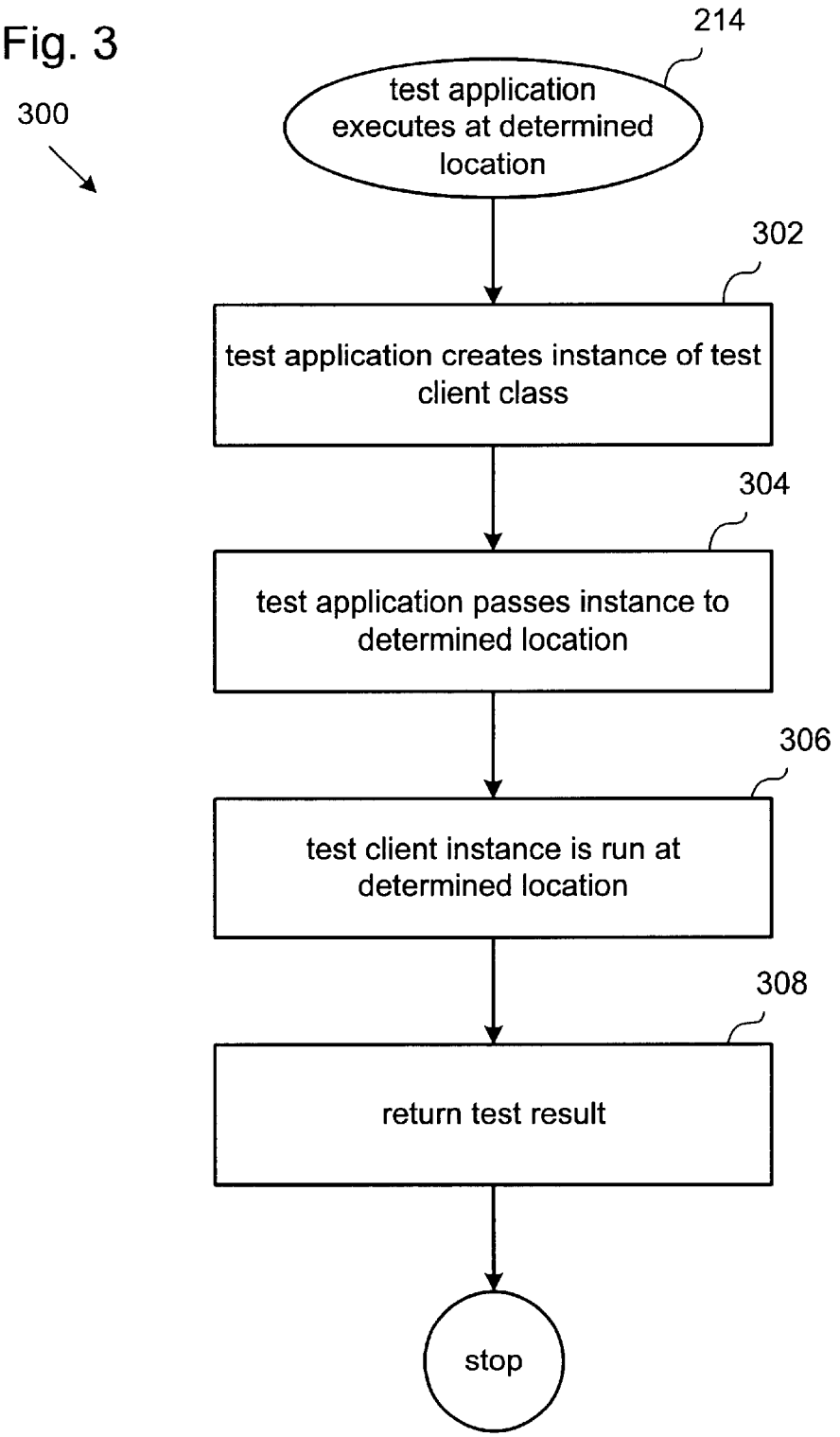
FIG. 3 is a flowchart detailing a process that is a particular implementation of the run operation shown in FIG. 2.

FIG. 3 is a flowchart detailing a process 300 that is a particular implementation of the run operation 214 shown in FIG. 2. The process 300 begins at 302 by the test application creating an instance of the test client class. At 304, the test application passes the instance to the determined location and at 306 the test client instance is run from the determined location. The result of the test is then returned at 308.

Figure 4:
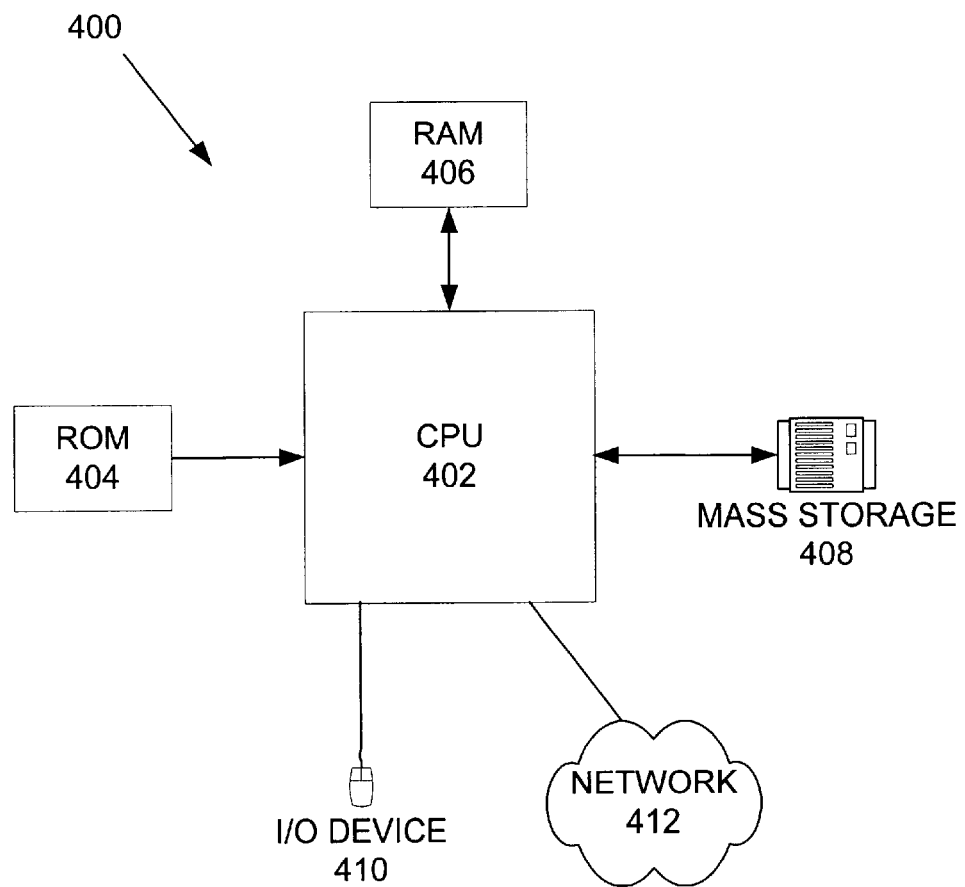
FIG. 4 illustrates a computer system that can be employed to implement the present invention.

FIG. 4 illustrates a computer system 400 that can be employed to implement the present invention. The computer system 400 or, more specifically, CPUs 402, may be arranged to support a virtual machine, as will be appreciated by those skilled in the art. As is well known in the art, ROM acts to transfer data and instructions uni-directionally to the CPUs 402, while RAM is used typically to transfer data and instructions in a bi-directional manner. CPUs 402 may generally include any number of processors. Both primary storage devices 404, 406 may include any suitable computer-readable media. A secondary storage medium 408, which is typically a mass memory device, is also coupled bi-directionally to CPUs 402 and provides additional data storage capacity. The mass memory device 408 is a computer-readable medium that may be used to store programs including computer code, data, and the like. Typically, mass memory device 408 is a storage medium such as a hard disk or a tape which generally slower than primary storage devices 404, 406. Mass memory storage device 408 may take the form of a magnetic or paper tape reader or some other well-known device. It will be appreciated that the information retained within the mass memory device 408, may, in appropriate cases, be incorporated in standard fashion as part of RAM 406 as virtual memory. A specific primary storage device 404 such as a CD-ROM may also pass data uni-directionally to the CPUs 402.

CPUs 402 are also coupled to one or more input/output devices 410 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 402 optionally may be coupled to a computer or telecommunications network, e.g., an Internet network, or an intranet network, using a network connection as shown generally at 412. With such a network connection, it is contemplated that the CPUs 402 might receive information from the network, or might output information to the network in the course of performing the above-described method steps. Such information, which is often represented as a sequence of instructions to be executed using CPUs 402, may be received from and outputted to the network, for example, in the form of a computer data signal embodied in a carrier wave. The above-described devices and materials will be familiar to those of skill in the computer hardware and software arts.

It should be noted that the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general-purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

Although only a few embodiments of the present invention have been described, it should be understood that the present invention may be embodied in many other specific forms without departing from the spirit or the scope of the present invention.

Although the methods of performing a distributed test in an enterprise computing system in accordance with the present invention are particularly suitable for implementation with respect to a Java™ based environment; the methods may generally be applied in any suitable object-based environment. In particular, the methods are suitable for use in platform-independent object-based environments. It should be appreciated that the methods may also be implemented in some distributed object-oriented systems.

It should also be appreciated that the present invention may generally be implemented on any suitable object-oriented computer system. Therefore, the present examples are to be considered as illustrative and not restrictive, and the invention is not to be limited to the details given herein, but may be modified within the scope of the appended claims along with their full scope of equivalents.

What is claimed is:

1. A component tester arranged to perform a component test at any of a number of locations in a distributed network connected thereto, comprising:
   a service test creator unit arranged to create a service test;
   a test application server coupled to the service test creator unit having at least a test application program that includes a plurality of vehicle classes each of which is used to implement an associated object type that is run in each of a plurality of containers;
   a packager unit coupled to the test application server arranged to automatically package the service test with an appropriate one of the vehicle classes;
   a deployer unit coupled to the packager unit arranged to deploy the packaged service test into the associated container; and
   an execution unit coupled to the deployer unit arranged to run the packaged service test in the associated container.

2. A component tester as recited in claim 1, wherein the distributed network is an enterprise computing system.

3. A component tester as recited in claim 2, further comprising:
   a compatibility test suite builder unit coupled to the enterprise computing system wherein the automatic packaging of the service test with the appropriate one of the vehicle classes is performed during the build process of a compatibility test suite (CTS).

4. A component tester as recited in claim 3, wherein the CTS is used to assure compatibility of the various components in the enterprise computing system.

5. A component tester as recited in claim 1, wherein the plurality of vehicle classes includes a Java Server Page (JSP) vehicle, a servlet vehicle, and an Enterprise Java Bean (EJB) vehicle.

6. In a client/server computing environment having a number of server computers and at least one client computer coupled to at least one of the server computers that is a test application server computer having a test application program, a method of executing a component test on any of the computers, comprising:
   creating a service test;
   instantiating a plurality of vehicle classes by the test application program each of which is used to implement an associated object type that is run in each of a plurality of containers;
   automatically packaging the service test with an appropriate one of the vehicle classes;
   deploying the packaged service test into the associated container; and
   executing the packaged service test in the associated container.

7. A method as recited in claim 6, wherein the client/server computing environment is an enterprise computing system.

8. A method as recited in claim 7, further comprising:
   building a compatibility test suite (CTS) wherein the CTS is used to assure compatibility of the various components in the enterprise computing system unit.

9. A method as recited in claim 8, wherein the automatic packaging of the service test with the appropriate one of the vehicle classes is performed during the building of the compatibility test suite (CTS).

10. A method as recited in claim 6, wherein the plurality of vehicle classes includes a Java Server Page (JSP) vehicle, a servlet vehicle, and an Enterprise Java Bean (EJB) vehicle.

11. In a client/server computing environment having a number of server computers and at least one client computer coupled to at least one of the server computers that is a test application server computer having a test application program, an apparatus arranged to execute a component test on any of the computers, comprising:
    means for creating a service test;
    means for instantiating a plurality of vehicle classes by the test application program each of which is used to implement an associated object type that is run in each of a plurality of containers;
    means for automatically packaging the service test with an appropriate one of the vehicle classes;
    means for deploying the packaged service test into the associated container; and
    means for executing the packaged service test in the associated container.

12. An apparatus as recited in claim 11, wherein the client/server computing environment is an enterprise computing system.

13. An apparatus as recited in claim 11, further comprising:
    means for building a compatibility test suite (CTS) wherein the CTS is used to assure compatibility of the various components in the enterprise computing system unit.

14. An apparatus as recited in claim 13, wherein the automatic packaging of the service test with the appropriate one of the vehicle classes is performed during the building of the compatibility test suite (CTS).

15. An apparatus as recited in claim 11, wherein the plurality of vehicle classes includes a Java Server Page (JSP) vehicle, a servlet vehicle, and an Enterprise Java Bean (EJB) vehicle.

16. In a client/server computing environment having a number of server computers and at least one client computer coupled to at least one of the server computers that is a test application server computer having a test application program, computer program product for executing a component test on any of the computers, comprising: computer code for creating a service test;
    computer code for instantiating a plurality of vehicle classes by the test application program each of which is used to implement an associated object type that is run in each of a plurality of containers;
    computer code for automatically packaging the service test with an appropriate one of the vehicle classes;
    computer code for deploying the packaged service test into the associated container;
    computer code for executing the packaged service test in the associated container; and
    computer readable medium for storing the computer code.

17. Computer program product as recited in claim 16, wherein the client/server computing environment is an enterprise computing system.

18. Computer program product as recited in claim 17, further comprising:
    computer code for building a compatibility test suite (CTS) wherein the CTS is used to assure compatibility of the various components in the enterprise computing system unit.

19. Computer program product as recited in claim 18, wherein the automatic packaging of the service test with the appropriate one of the vehicle classes is performed during the building of the compatibility test suite (CTS).

20. Computer program product as recited in claim 16, wherein the plurality of vehicle classes includes a Java Server Page (JSP) vehicle, a servlet vehicle, and an Enterprise Java Bean (EJB) vehicle.

* * * * *